United States Patent
Han et al.

(10) Patent No.: US 7,512,396 B2
(45) Date of Patent: Mar. 31, 2009

(54) APPARATUS AND METHOD FOR REDUCING POWER CONSUMPTION IN DIGITAL BROADCAST RECEIVER

(75) Inventors: Jin Soo Han, Daejeon (KR); In Tark Han, Daejeon (KR); Youn Kwae Jeong, Daejeon (KR); Sung Il Nam, Daejeon (KR); Jung Chul Seo, Kyungki-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 451 days.

(21) Appl. No.: 11/500,121

(22) Filed: Aug. 7, 2006

(65) Prior Publication Data

US 2007/0117533 A1    May 24, 2007

(30) Foreign Application Priority Data

Nov. 18, 2005    (KR) ............... 10-2005-0110850

(51) Int. Cl.
*H04B 1/16* (2006.01)
(52) U.S. Cl. .............. 455/343.1; 455/127.5; 455/343.2; 455/343.5
(58) Field of Classification Search .............. 455/343.1, 455/127.5, 343.2, 343.5, 572, 574, 127.1, 455/3.02, 298, 299
See application file for complete search history.

(56) References Cited

U.S. PATENT DOCUMENTS

2006/0082690 A1* 4/2006 Englert ................. 348/731
2006/0089179 A1* 4/2006 Rhee et al. .............. 455/574
2007/0287495 A1* 12/2007 Takuma ................ 455/550.1

FOREIGN PATENT DOCUMENTS

| KR | 1019960001549 | 2/1996 |
|---|---|---|
| KR | 10-0386246 | 12/2000 |
| KR | 10-0393574 | 7/2002 |
| KR | 10-2005-0000823 | 1/2005 |

OTHER PUBLICATIONS

'The Home Networking System Based on IEEE1394 and Ethernet Technologies' Shimada et al., Central Technology Laboratory, Asahi Kasei Corp., pp. 234-235.
'Intelligent Standby Concept' Mozar, IEEE Transactions on Consumer Electronics, vol. 46, No. 1, Feb. 2000, pp. 179-182.
'Design for low electric power during standby state of Fax-Copier machine' Matsushita, Communication Systems Division, Ricoh Company, Ltd.

* cited by examiner

*Primary Examiner*—Pablo N Tran
(74) *Attorney, Agent, or Firm*—Ladas & Parry LLP

(57) ABSTRACT

An apparatus for reducing power consumption in a digital broadcast receiver is provided. An AC-to-DC converter converts input AC power into DC power that can be used in the receiver. A power control switch selectively supplies the DC power from the converter to a tuner unit and a decoder according to a command of a controller. The tuner unit receives broadcast channel signals and demodulates the received broadcast channel signals according to the respective broadcast formats. The decoder receives the demodulated broadcast signals from the tuner unit and decodes analog/digital broadcast signals. A multimedia output port is connected between the decoder and the display unit to transfer the audio/video output signals from the decoder to the display unit. The controller detects the state of the display unit through the multimedia output port to control whether to supply the DC power through the power control switch.

5 Claims, 4 Drawing Sheets

APPARATUS AND METHOD FOR REDUCING POWER CONSUMPTION IN DIGITAL BROADCAST RECEIVER

RELATED APPLICATIONS

The present application is based on, and claims priority from, Korean Application Number 2005-110850, filed Nov. 18, 2005, the disclosure of which is hereby incorporated by reference herein in its entirety.

BACKGROUND OF THE INVENTION

1. Field of the Invention

The present invention relates to an apparatus and method for reducing power consumption in a digital broadcast receiver, and more particularly, to an apparatus and method for reducing the total power consumption in a broadcast receiver by interrupting power supply to unnecessarily-operated blocks of the broadcast receiver.

2. Description of the Prior Art

With the start of a test service for digital broadcasting, a demand for a digital broadcast receiver (e.g., a set top box) increases and thus supply of the digital broadcast receiver increases greatly.

To accord with this trend, attempts continue to be made to reduce power consumption in a digital broadcast receiver as well as in general household appliances, and a variety of standby power reduction methods are implemented using new technologies. For example, Korean Patent No. 0393574, Korean Patent No. 0386246, and Korean Patent Publication No. 2005-0000823 disclose a device (circuit) for reducing standby power of an electronic device. However, researches on a method for reducing the total power consumption in the digital broadcast receiver are insufficient.

In the digital broadcast receiver, a tuner and a decoder are the main components that generate a great amount of heat and consume much power. Moreover, the tuner and the decoder unnecessarily consume the power even in a standby state.

SUMMARY OF THE INVENTION

The present invention provides an apparatus and method for reducing the total power consumption in a broadcast receiver by interrupting power supply to a broadcast receiving tuner unit and a decoder in the broadcast receiver when the broadcast receiving tuner unit and the decoder need not operate.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for reducing power consumption in a digital broadcast receiver includes: an AC-to-DC converter for converting AC power input to the digital broadcast receiver into DC power that can be used in the digital broadcast receiver; a power control switch for selectively supplying the DC power from the AC-to-DC converter to a tuner unit and a decoder according to a command of a controller; the tuner unit for receiving broadcast channel signals and demodulating the received broadcast channel signals in accordance with the respective broadcast formats; the decoder for receiving the demodulated broadcast signals from the tuner unit and decoding analog/digital broadcast signals; a multimedia output port connected between the decoder and the a display unit to transfer the audio/video output signals from the decoder to the display unit; and the controller for detecting the state of the display unit through the multimedia output port to control whether to supply the DC power through the power control switch.

According to an aspect of the present invention, there is provided an apparatus for reducing power consumption in a digital broadcast receiver, the apparatus including: an AC-to-DC converter for converting AC power input to the digital broadcast receiver into DC power that can be used in the digital broadcast receiver; a power control switch for selectively supplying the DC power from the AC-to-DC converter to a tuner unit and a broadcast distributor according to a command of a controller; the tuner unit for receiving broadcast channel signals and demodulating the received broadcast channel signals in accordance with the respective broadcast formats; the broadcast distributor for receiving the signals from the tuner unit and transferring the received signals to an external A/V player through a transfer interface; and the controller for commanding the power control switch to interrupt power supply to the tuner unit and the broadcast distributor, when receiving a request for termination of a broadcast service from the external A/V player.

According to another aspect of the present invention, there is provided an apparatus for reducing power consumption in a digital broadcast receiver, the apparatus including: an AC-to-DC converter for converting AC power input to the digital broadcast receiver into DC power that can be used in the digital broadcast receiver; a power control switch for selectively supplying the DC power from the AC-to-DC converter to one or more tuner units, a broadcast distributor and a decoder according to a command of a controller; the tuner units for receiving one or more broadcast channel signals and demodulating the received broadcast channel signals in accordance with the respective broadcast formats; the decoder for receiving the demodulated broadcast signals from the tuner units and decoding analog/digital broadcast signals; the broadcast distributor for receiving the signals from the tuner units and transferring the received signals to an external A/V player through a transfer interface; a multimedia output port connected between the decoder and the a display unit to transfer the audio/video output signals from the decoder to the display unit; and the controller for controlling whether to supply the DC power through the power control switch, by detecting the state of through the multimedia output port or by receiving a request from the external A/V player.

According to a further another aspect of the present invention, there is provided a method for reducing power consumption in a digital broadcast receiver, the method including the steps of: supplying DC power to a controller and a power control switch through an AC-to-DC converter for converting AC power into DC power; determining whether to supply the DC power through the power control switch by detecting the state of a display unit through a multimedia output port; transmitting a power supply interrupting command to the power control switch when the display unit is in a standby state; and receiving, at the power control switch, the power supply interrupting command, to interrupt power supply to a tuner unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF THE PREFERRED EMBODIMENTS

Figure 1:
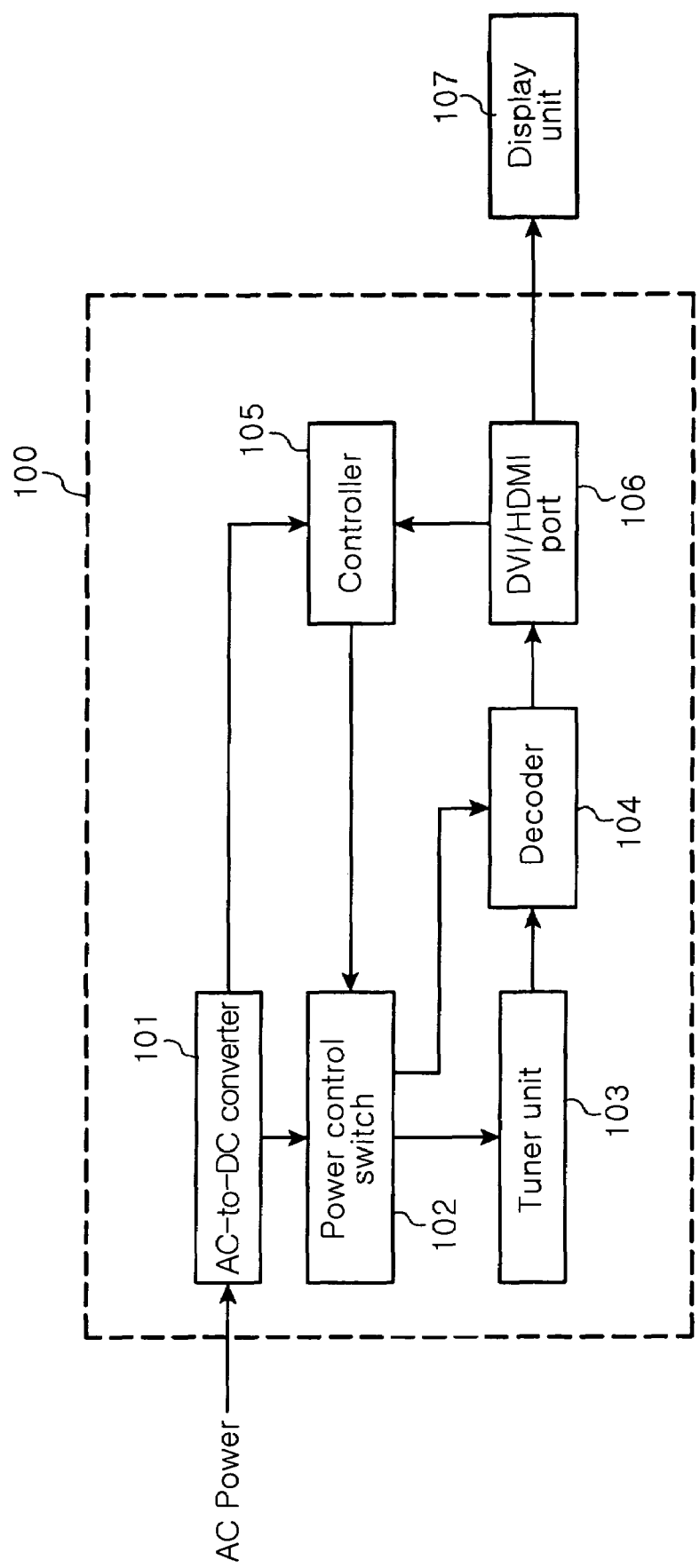
FIG. 1 is a block diagram of a power-saving broadcast receiver according to a first embodiment of the present invention, which can turn on/off power supply to a broadcast receiving tuner unit and a decoder depending on whether the broadcast receiving tuner unit and the decoder need operate.

Reference will now be made in detail to the preferred embodiments of the present invention, examples of which are illustrated in the accompanying drawings.

The present invention interrupts power supply to unnecessarily-operated blocks of a digital broadcast receiver to reduce power consumption in the digital broadcast receiver. For example, the present invention proposes an apparatus and method for reducing the total power consumption in a broadcast receiver having a structure where broadcast signals are transferred to a display unit through a DVI/HDMI (digital video interface/high definition multimedia interface) port or a structure where distributed broadcast signals are transferred to an external player through an external transfer interface, by interrupting power supply to unnecessarily-operated blocks (e.g., a tuner unit, a demodulator, and a decoder) of the broadcast receiver.

Also, the present invention provides an apparatus and method capable of reducing power consumption in a digital broadcast receiver. In an embodiment, the apparatus includes: a tuner unit (including a demodulator) for selecting a physical channel of a digital broadcast; an MPEG (moving picture experts group) decoder for receiving the output signals from the tuner unit and decoding MPEG signals; a DVI/HDMI port for transferring A/V (audio/video) signals from the MPEG decoder to a display unit; a power supply unit for supplying power to all components of the digital broadcast receiver; a switch (or a relay) for selectively supplying power to digital broadcast tuners; a power controller for detecting the state of the display unit through a HotPlugDetect pin of the DVI/HDMI port; and the display unit capable of displaying its own state using the HotPlugDetect pin.

In this structure, when the display unit is converted into an off state, the present invention detects the off state of the HotPlugDetect pin to interrupt power supply to the tuner unit, the MPEG decoder or a broadcast distributor, which receive broadcast signals transferred to the display unit.

In another embodiment, an apparatus for reducing power consumption in a broadcast receiver includes: an AC-to-DC converter for converting AC power into DC power; a power control switch for selectively supplying the DC power to internal components of the broadcast receiver; tuner unit (including a demodulator) for tuning and demodulating broadcast signals in accordance with a specific broadcast channel; a decoder for decoding the demodulated signal from the tuner unit; a broadcast distributor for distributing the broadcast signals from the tuner unit; a transfer interface for transferring the distributed broadcast signals to other corresponding components; and a controller for controlling the power control switch by detecting the state of a display unit to determine whether to supply power to the tuner unit, the decoder or the broadcast distributor.

Hereinafter, the preferred embodiment of the present invention will be described in detail with reference to FIGS. 1 to 4.

FIG. 1 is a block diagram of a power-saving broadcast receiver according to a first embodiment of the present invention, in which detailed illustration of peripheral circuits and components for a broadcast receiving operation is omitted for conciseness.

Referring to FIG. 1, a power-saving broadcast receiver 100 includes an AC-to-DC converter 101, a power control switch 102, a controller 105, a broadcast receiving tuner unit 103, a decoder 104, and a DVI/HDMI port 106, which interwork with one another.

AC power is input to the AC-to-DC converter 101 of the power-saving broadcast receiver 100. The AC-to-DC converter 101 converts the AC power into DC power that can be used in the power-saving broadcast receiver 100.

Under the control of the controller 105, the voltage control switch 102 supplies the DC power from the AC-to-DC converter 101 to the broadcast receiving tuner unit 103 and the decoder 104.

The broadcast receiving tuner unit 103 includes a demodulator (not illustrated). The broadcast receiving tuner unit 103 receives terrestrial broadcast channel signals, cable broadcast channel signals, or satellite broadcast channel signals, demodulates the received channel signals according to the respective broadcast formats, and outputs the resulting signals to the decoder 104.

The decoder 104 decodes analog/digital broadcast signals and processes video/audio/data signals. The processed video/audio/data signals are outputted to a display unit 107. The display unit 107 displays the processed video/audio/data signals from the decoder 104.

The DVI/HDMI port is a kind of multimedia output port. The DVI/HDMI port 106 serves to connect the decoder 104 to the display unit 107 to transfer the video/audio signals from the decoder 104 to the display unit 107. The DVI/HDMI port 106 also functions to inform, through a HotPlugDetect pin, whether the display unit 107 is connected. That is, information about whether the display unit 107 is connected is transferred through the DVI/HDMI port 106 to the controller 105. At this point, the use of the HotPlugDetect pin is expanded such that a signal with a predetermined level for indicating the off state of the HotPlugDetect pin is generated when the display unit 107 is in a standby state. The standby state is a state where a user does not use the display unit 107.

That is, when the display unit 107 is connected but is nevertheless in the standby state, the HotPlugDetect pin is turned off to inform the power-saving broadcast receiver 100 that broadcasting is not being viewed.

The controller 105 detects, through the DVI/HDMI port 106, whether the display unit 107 is connected and is in the standby state. When the display unit 107 is connected and is in the standby state, the controller 105 commands the power control switch 102 to supply the DC power to the broadcast receiving tuner unit 103 and the decoder 104.

Figure 4:
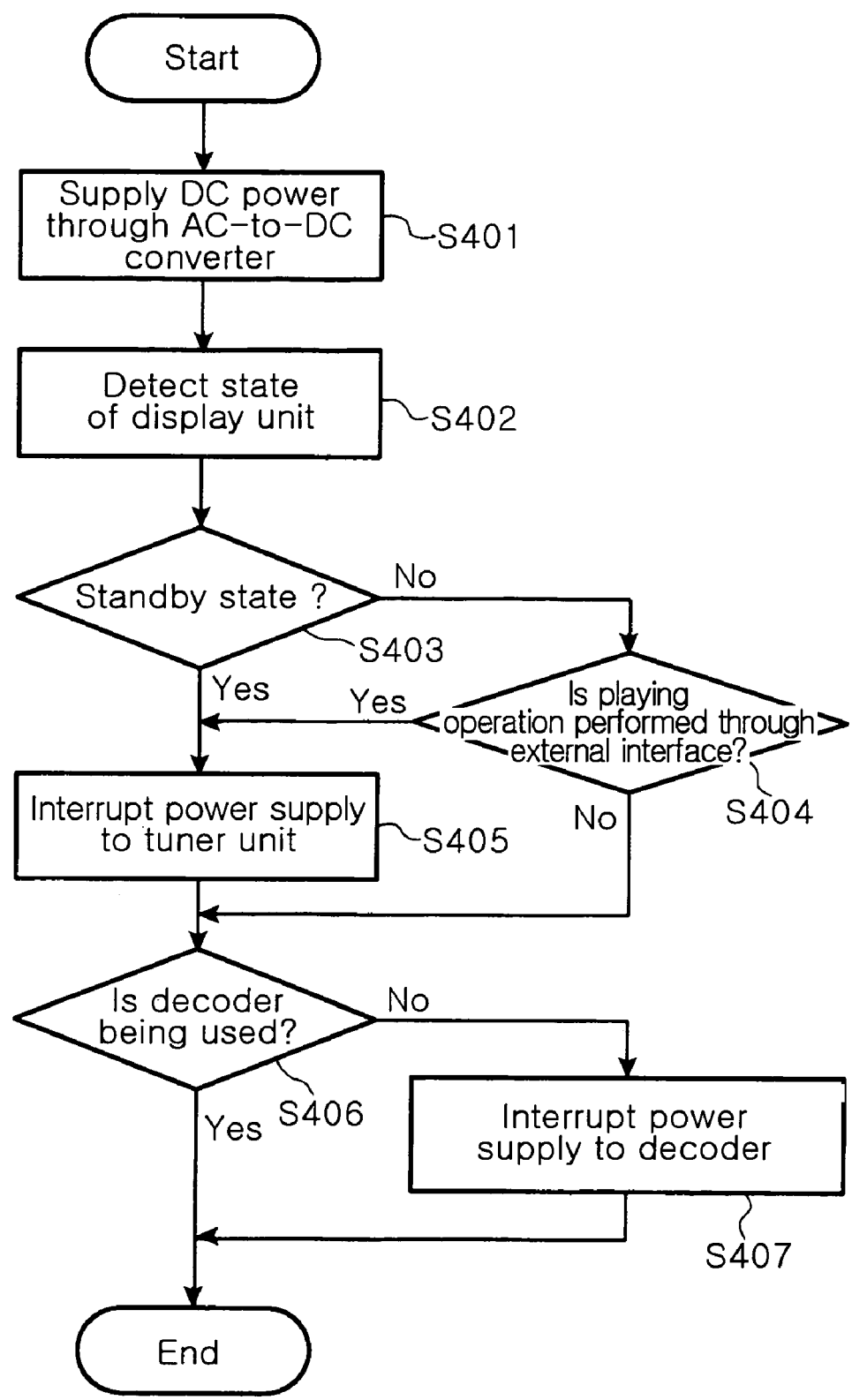
FIG. 4 is a flowchart illustrating a method for reducing power consumption in the broadcast receiver according to an embodiment of the present invention.

FIG. 4 is a flowchart illustrating a method for reducing power consumption in the broadcast receiver according to an embodiment of the present invention.

An operation of the power-saving broadcast receiver 100 will now be described in detail with reference to FIG. 4. Referring to FIG. 4, in step S401, DC power is supplied through the AC-to-DC converter 101 to the controller 105 and the power control switch 102. In step S402, using the HotPlugDetect of the DVI/HDMI port 106, the controller 105 detects the state of the display unit 107 to send a power supply control command to the power control switch 102. The power supply control command is a command for controlling whether to supply the DC power to the broadcast receiving tuner unit 103 or the decoder 104. According to the power supply control command of the controller, the power control switch 102 operates to turn on or off the DC power supply to the broadcast receiving tuner unit 103 or the decoder 104.

In step S403, it is determined whether the display unit 107 is in a standby state. If the display unit 107 is in a standby state, the method proceeds to step S405, and if not, the method proceeds to step S404. In step S404, it is determined whether an external interface (not illustrated) is used to perform a playing operation. Examples of the external interface are USB, IEEE1394, Ethernet, WLAN, UWB, DVD drive, and HDD. If the external interface is used to perform a playing operation, the method proceeds to step S405, and if not, the method proceeds to step S406. In operation S405, power supply to the broadcast receiving tuner unit 103 is interrupted. In operation S406, it is determined whether the decoder 104 is being used. If the decoder 104 is being used, the method ends, and if not, the method proceeds to step S407. In step S407, power supply to the decoder 104 is interrupted.

In this way, when multimedia signals are viewed in a normal operation state of the display unit 107, the power control switch 102 operates to supply the DC power to the broadcast receiving tuner unit 103 and the broadcast receiving tuner unit 103. On the other hand, when the display unit 107 is converted from the normal operation state to the standby state (step S403), the power-saving broadcast receiver 100 detects the standby state through the DVI/HDMI port 106 to interrupt power supply to the broadcast receiving tuner unit 103 (step S405). In this state, when the decoder 104 is not being used for other purposes (step S406), power supply to the decoder 104 is also interrupted (step S407).

Also, when the power-saving broadcast receiver 100 uses multimedia signals received from the external interface (step S404), the broadcast receiving tuner unit 103 need not be used. In this case, even when the HotPlugDetect pin is in an on state, power supply to the broadcast receiving tuner unit 103 is interrupted (step S405).

Meanwhile, when the power-saving broadcast receiver 100 is used merely for reception of broadcast channel signals, the standby state of the display unit 107 may be linked with that of the power-saving broadcast receiver 100. That is, when the display unit 107 is converted to the standby state, the controller 105 of the power-saving broadcast receiver 100 detects the standby state of the display unit 107 through the DVI/HDMI port 106 to interrupt power supply to other components than the AC-to-DC converter 101 and the controller 105, such that the power-saving broadcast receiver 100 also enter the standby sate. On the other hand, when the display unit 107 is converted from a standby state to a normal operation state, the power-saving broadcast receiver 100 is also converted from a standby state to a normal operation state under the control of the controller 105.

At this point, the DVI/HDMI port 106 may be any multimedia port that can support the HotPlugDetect pin.

Figure 2:
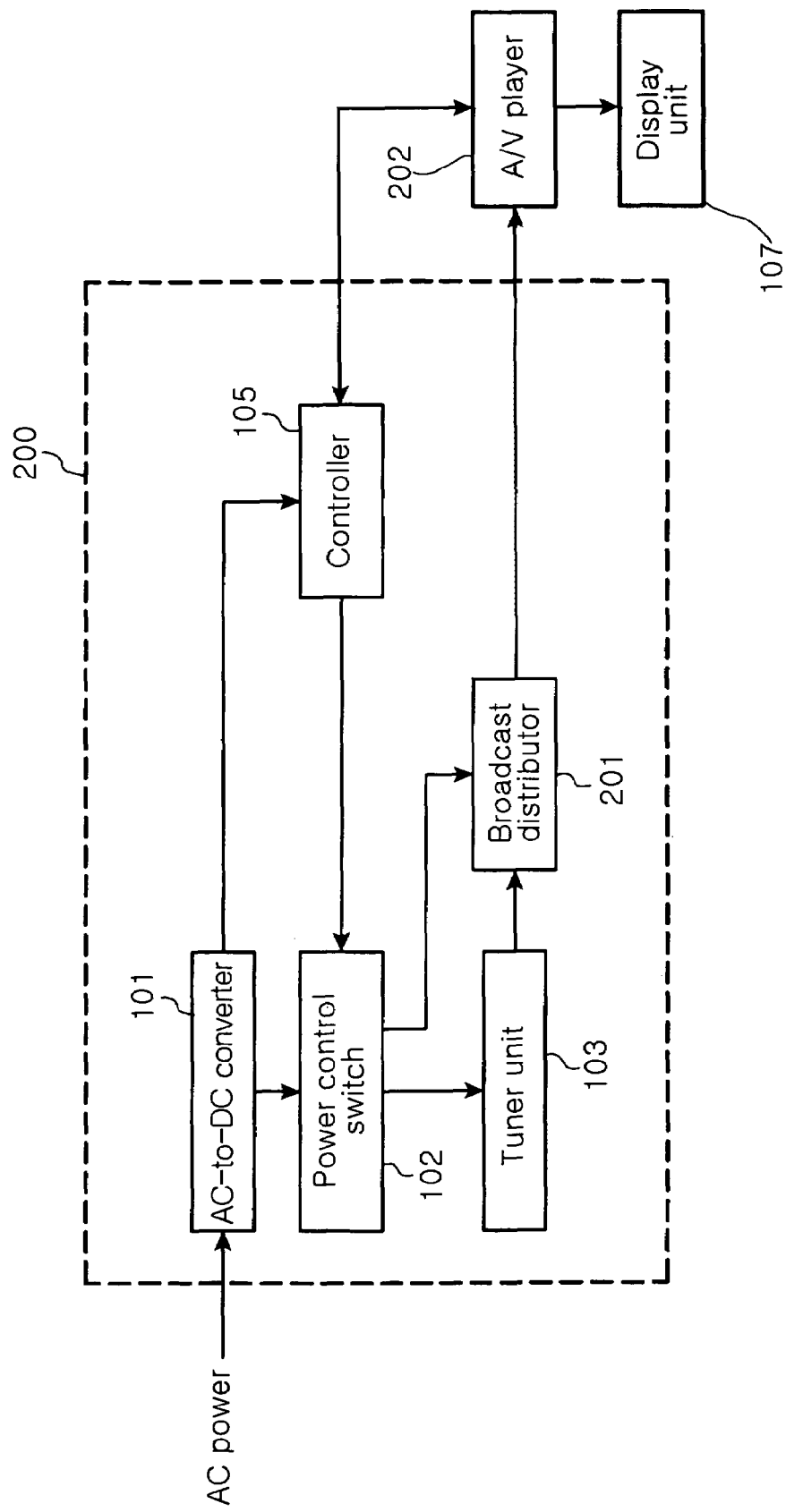
FIG. 2 is a block diagram of a power-saving broadcast receiver according to a second embodiment of the present invention, which can turn on/off power supply to a broadcast receiving tuner unit and a broadcast distributor depending on whether the broadcast receiving tuner unit and the broadcast distributor need operate.

FIG. 2 is a block diagram of a power-saving broadcast receiver according to a second embodiment of the present invention.

Referring to FIG. 2, a power-saving broadcast receiver 200 according to the second embodiment uses a broadcast distributor 210 instead of the decoder 104 of the power-saving broadcast receiver 100.

The broadcast distributor 210 receives signals from the broadcast receiving tuner unit 103, and transfers the received signals to internal and external players through a transfer interface. The transfer interface may be any interface such as IEEE 1394, UBS, Ethernet, WLAN, and UWB, which can be used in computers and home appliances. The decoder 104 of FIG. 1 may be regarded as being included in an A/V player (or a mobile player) 202 of FIG. 2.

An operation of the power-saving broadcast receiver 200 will now be described in detail.

The AC-to-DC converter 101 converts AC power into DC power and supplies the DC power to the power control switch 102 and the controller 105. Broadcast channel signals from the broadcast receiving tuner unit 103 are transferred through the broadcast receiving tuner unit 103 are transferred through the broadcast distributor 210 and the transfer interface to the A/V player 202. The A/V player 202 decodes the broadcast channel signals and transfers the resulting signals to the display unit 107.

Power is supplied to the broadcast receiving tuner unit 103 and the broadcast distributor 201 in the normal operation state. Upon receiving a request for termination of a broadcast service from the A/V player 202, the controller 105 interrupts power supply to the broadcast receiving tuner unit 103 and the broadcast distributor 210. Meanwhile, when the broadcast receiving tuner unit 103 includes one or more tuners, power supply is interrupted with respect to only a tuner that is not being used and power is supplied to the broadcast distributor 210, thereby saving power to be otherwise supplied to the tuner that is not being used.

Figure 3:
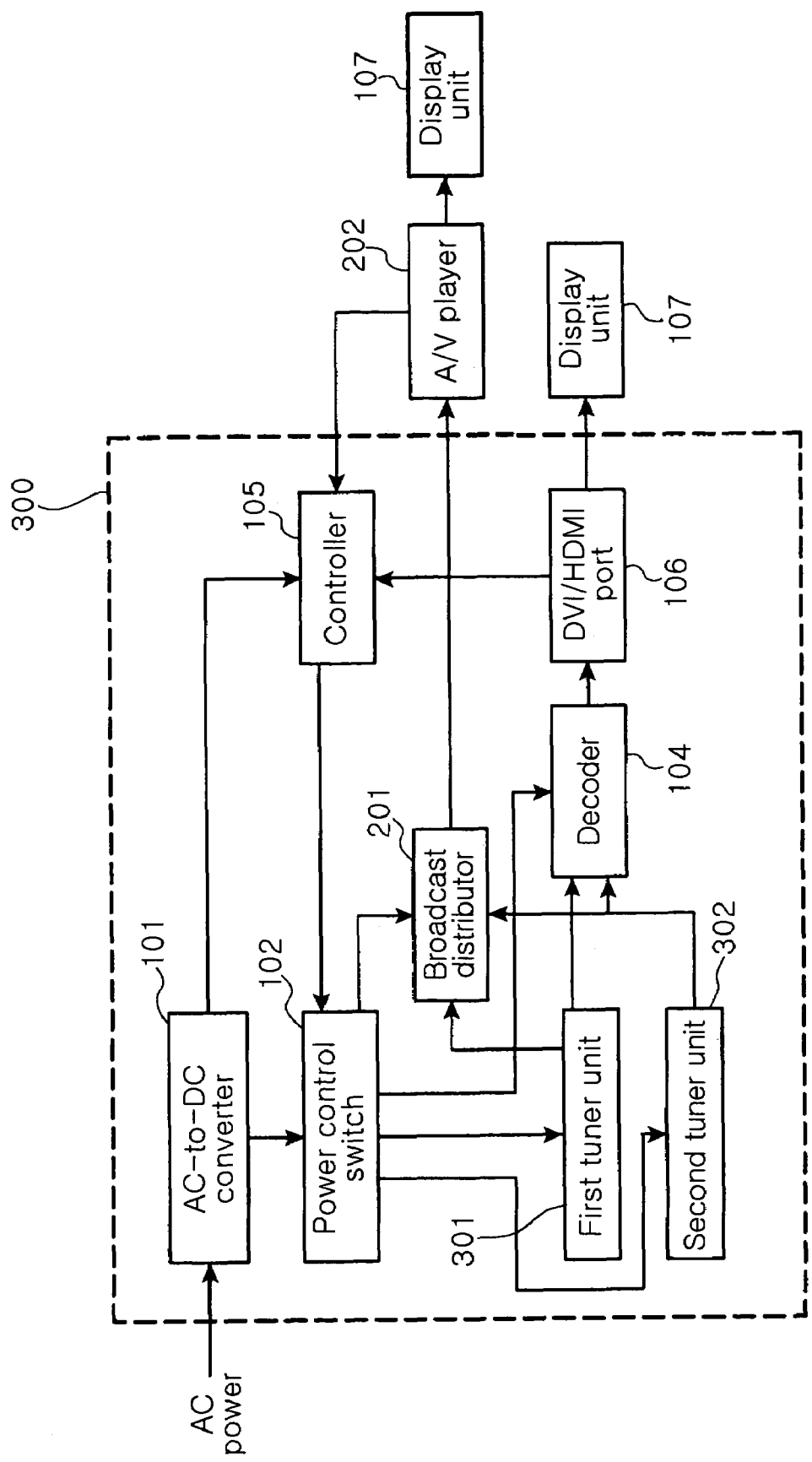
FIG. 3 is a block diagram of a power-saving broadcast receiver according to a third embodiment of the present invention, which can turn on/off power supply to a broadcast receiving tuner unit and a broadcast distributor depending on whether the broadcast receiving tuner unit and the broadcast distributor need operate.

FIG. 3 is a block diagram of a power-saving broadcast receiver according to a third embodiment of the present invention.

Referring to FIG. 3, a power-saving broadcast receiver 300 according to the third embodiment is the combination of the power-saving broadcast receivers 100 and 200.

The power-saving broadcast receiver 300 includes two or more broadcast receiving tuner units 301 and 302. The first and second broadcast receiving tuner units 301 and 302 are all connected to the broadcast distributor 201 and the decoder 104. The broadcast distributor 201 receives broadcast signals from the first and second broadcast receiving tuner units 301 and 302, processes the received broadcast signals, and supplies the processed broadcast signals to the A/V player 202 through an transfer interface. The decoder 104 receives broadcast signals form the first and second broadcast receiving tuner units 301 and 302, decodes the received broadcast signals, and transfers the resulting signals to the display unit 107 through the DVI/HDMI port 106.

An operation of the power-saving broadcast receiver 300 will now be described in detail.

The AC-to-DC converter 101 converts AC power into DC power, and always supplies the DC power to the power control switch 102 and the controller 105. The power control switch 102 selectively supplies the DC power to the first and second broadcast receiving tuner units 301 and 302, the decoder 104, and the broadcast distributor 201.

The first and second broadcast receiving tuner units 301 and 302 selects broadcast channels according to a user's request, and transfers the corresponding broadcast signals to the broadcast distributor 201 or the decoder 104. The broadcast distributor 201 transfers the broadcast signals from the first and second broadcast receiving tuner units 301 and 302 to the A/V player 202. The decoder 104 decodes the broadcast signals form the first and second broadcast receiving tuner units 301 and 302, and transfers the resulting signals to the display unit 107 through the DVI/HDMI port 106.

If the display unit 107 connected to the DVI/HDMI port 106 is converted into the standby state or if the corresponding cable is disconnected, the controller 105 detects such conditions to interrupt power supply to the first and second broadcast receiving tuner units 301 and 302 that were being used by the display unit 107. For example, when the A/V player 202 receives a request for termination of a service of a broadcast channel that is being received, the controller 105 interrupts power supply to the broadcast receiving tuner units 301 and 302 corresponding to the above broadcast channel.

Meanwhile, when a service of the broadcast distributor 201 is not requested at all, only the power supply to the broadcast distributor 201 may be interrupted irrespective of the tuners. Likewise, when the decoder 104 is not being used at all, only the power supply to the decoder 104 may be interrupted regardless of the tuner units 301 and 302.

As described above, when display unit is disconnected or is in the standby state, the present invention detects the disconnected or standby state of the display unit through the HotPlugDetect pin of the DVI/HDMI port to interrupt power supply to the tuner providing the corresponding channel signal, thereby making it possible to reduce the power consumption in the broadcast receiver.

Also, when the service termination request is generated from the A/V player, the controller of the present invention detects such conditions to interrupt power supply to the corresponding tuner, thereby making it possible to reduce the power consumption in the broadcast receiver.

Also, when the broadcast distributor and the decoder are not being used, the present invention interrupts power supply to the broadcast distributor and the decoder, thereby making it possible to reduce the power consumption in the broadcast receiver.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for reducing power consumption in a digital broadcast receiver, the apparatus comprising:
    an AC-to-DC converter for converting AC power input to the digital broadcast receiver into DC power that can be used in the digital broadcast receiver;
    a power control switch for selectively supplying the DC power from the AC-to-DC converter to one or more tuner units, a broadcast distributor and a decoder according to a command of a controller;
    the tuner units for receiving one or more broadcast channel signals and demodulating the received broadcast channel signals in accordance with the respective broadcast formats;
    the decoder for receiving the demodulated broadcast signals from the tuner units and decoding analog/digital broadcast signals;
    the broadcast distributor for receiving the signals from the tuner units and transferring the received signals to an external A/V player through a transfer interface;
    a multimedia output port connected between the decoder and the a display unit to transfer the audio/video output signals from the decoder to the display unit; and
    the controller for controlling whether to supply the DC power through the power control switch, by detecting the state of the display unit through the multimedia output port or by receiving a request from the external A/V player.

2. The apparatus of claim 1, wherein the multimedia output port is a DVI/HDMI (digital video interface/high definition multimedia interface) port.

3. The apparatus of claim 1, wherein the multimedia output port includes a HotPlugDetect pin for detecting whether the display unit is connected.

4. The apparatus of claim 1, further comprising a transfer interface for transferring the output signal of the broadcast distributor to the external A/V player.

5. The apparatus of claim 4, wherein the transfer interface is one selected from the group consisting of IEEE1394, USB, Ethernet, WLAN, and UWB.

* * * * *